United States Patent [19]

Berg et al.

[11] Patent Number: 4,463,737
[45] Date of Patent: Aug. 7, 1984

[54] FUEL SYSTEM HAVING GASKET HEATER

[75] Inventors: Peter G. Berg, Attleboro Falls, Mass.; Stephen J. Strobel, Providence, R.I.

[73] Assignee: Texas Instruments Incorporated, Dallas, Tex.

[21] Appl. No.: 526,769

[22] Filed: Aug. 26, 1983

[51] Int. Cl.³ .............................................. F02M 31/00
[52] U.S. Cl. .................... 123/549; 123/552; 123/547; 123/545; 261/142; 219/207
[58] Field of Search .................... 219/205, 206, 207; 123/549, 552, 547, 545, 546; 261/142, 144, 145

[56] References Cited

U.S. PATENT DOCUMENTS

| | | | |
|---|---|---|---|
| 1,632,139 | 6/1927 | Mattison | 219/206 |
| 4,279,234 | 7/1981 | Marcoux | 123/557 |
| 4,361,125 | 11/1982 | Igashira | 219/206 |
| 4,366,798 | 1/1983 | Goto | 123/545 |
| 4,377,148 | 3/1983 | Ishida | 123/545 |
| 4,389,354 | 6/1983 | Endou | 261/142 |
| 4,390,000 | 6/1983 | Igashira | 261/142 |

*Primary Examiner*—Ronald H. Lazarus
*Attorney, Agent, or Firm*—James P. McAndrews; John A. Haug; Melvin Sharp

[57] ABSTRACT

A fuel system for an internal combustion engine has an electrical resistance heater accommodated in gasket means disposed between a throttle body flange and a mating flange on an intake manifold so that the heater is located immediately adjacent an idling speed fuel inlet nozzle or the like in the throttle body for transferring heat to the nozzle area through the throttle body flange to prevent freeze-up of the nozzle during engine operation.

2 Claims, 2 Drawing Figures

FUEL SYSTEM HAVING GASKET HEATER

BACKGROUND OF THE INVENTION

The field of this invention is that of fuel systems for furnishing an air-fuel mixture to an internal combustion engine, and the invention relates more particularly to means for preventing freeze-up of a fuel supply or inlet means such as, idle screw or nozzle means or the like in a throttle body used in such a system during operation of the system.

In throttle body automotive fuel systems wherein idling speed fuel supply or fuel inlet nozzle means or the like are arranged in a throttle body for furnishing a selected fine stream of fuel into a throttle body for evaporating the fuel to form an air-fuel mixture to be furnished to an engine during idling operation of the engine, the cooling effect of expansion or evaporation of air and/or air-fuel mixtures in the throttle body means has a tendency to cause at least temporary freeze-up of such idle speed fuel inlet nozzle means with resulting failure of engine firing or loss of suitable engine driveability. Similar problems can also occur with freeze-up of air inlet nozzles or openings or the like in throttle bodies used in throttle body fuel injection systems or in direct port fuel injection systems and the like. Such freeze-ups tend to occur particularly during the occurrence of selected atmospheric conditions. It would be desirable if heat could be furnished to throttle bodies of such systems promptly after initiation of engine operation to prevent such freeze-ups.

SUMMARY OF THE INVENTION

It is an object of this invention to provide a novel and improved fuel supply system; to provide such a system having means adapted to be compactly accommodated in the system for furnishing heat to the system for preventing freeze-up of idle speed fuel supply nozzle means or the like in the system during operation of the system; and to provide such a system which is of rugged, reliable, and economical structure.

Briefly described, the novel and improved fuel supply system of this invention comprises throttle body means having passage means therein open at one end for communicating with a corresponding opening in an intake manifold of an internal combustion engine. The throttle body means has flange means which are disposed around the open end of the passage means to mate with corresponding flange means provided on the intake manifold around the manifold opening. Idle speed fuel supply or inlet nozzle means or the like are provided on the throttle body means at a selected location relative to the throttle body flange means for furnishing fuel to be evaporated within the throttle body means to form an air-fuel mixture to be furnished to the engine through the passage means during idling operation of the engine. Gasket means are provided between the throttle body flange means and the mating engine flange means and electrical resistance means are accommodated at a location between portions of the throttle body and engine flange means in a selected disposition within the gasket means relative to the noted nozzle means to transfer heat to the throttle body flange means for preventing freeze-up of the nozzle means during operation of the fuel supply system.

In a preferred embodiment of this invention, the gasket heater means has a low profile to be compactly accommodated between the throttle body flange means and the mating engine flange means, the gasket heater means preferably comprising a first spacer layer member of a relatively rigid electrically and thermally insulating material such as a phenolic material or the like of selected thickness. The spacer member has a first opening forming a chamber in the spacer and has a second opening which is aligned between the throttle body passage means and the intake manifold opening. A second heat-transfer layer member formed of a thermally and electrically conductive material such as aluminum or the like having an opening therein aligned with the passage means has one side secured in overlying substantially coextensive and preferably in sealing, relation to one side of the spacer member to extend over the spacer chamber. An electrically conductive terminal member is embedded in the spacer member, preferably flush with an outer surface of an opposite side of the spacer member, so that the terminal means extends into the spacer chamber and preferably seals the chamber. A self-regulating electrical resistance heater of a ceramic material or the like of positive temperature coefficient of resistivity has one side secured in thermally and electrically conductive relation to said one side of the heat-transfer member so that the heater is accommodated within and sealed in protected relation within the spacer chamber by the relatively rigid spacer material. Spring means are also accommodated in the chamber for electrically connecting an opposite side of the heater to said terminal means. Third and fourth gasket layer members of a relatively thin and compressible electrically insulating gasket material such as an asbestos-filled nitrile compound or the like have respective openings therein aligned with the throttle body passage means, the third and fourth members being secured in substantially coextensive, overlying relation to an opposite side of the heat-transfer member and to said opposite side of the spacer respectively in sealing engagement with respective throttle body flange means and the mating engine flange means. In a preferred embodiment, the noted terminal means has an end extending therefrom beyond a lateral edge of the spacer member for connecting one side of the heater in an electrical circuit. The third gasket layer member also preferably has an additional opening therein and additional resilient spring means are secured in electrically conductive relation to the heat-transfer member to extend through said additional opening to electrically engage the throttle body flange means for connecting the other side of the heater in the electrical circuit.

In that arrangement, the heater is adapted to be energized promptly on initiation of operation of the engine to avoid freeze-up of the idle speed fuel inlet nozzle means or the like provided in the throttle body means as air or an air-fuel mixture is furnished to the engine through the throttle body. The gasket heater means is compact, reliable and inexpensive and is adapted to be easily and reliably accommodated between the throttle body means and the engine for providing improved engine operation.

DESCRIPTION OF THE DRAWINGS

Other objects, advantages and details of the novel and improved fuel supply system and gasket heater means of this invention appear in the following detailed description referring to the drawings in which.

DESCRIPTION OF THE PREFERRED EMBODIMENTS

Figure 1:
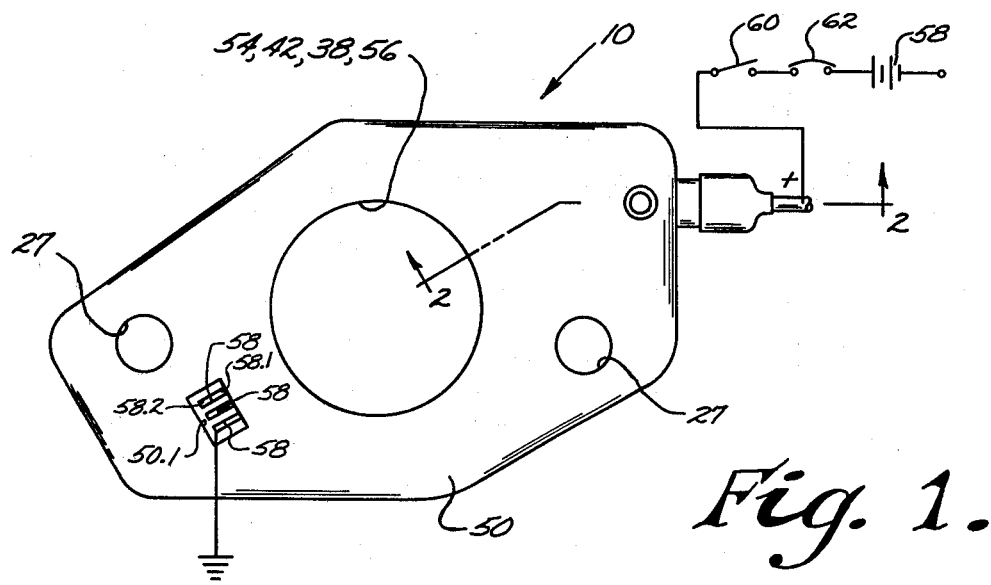
FIG. 1 is a plan view of the novel and improved gasket heater means of this invention.
Figure 2:
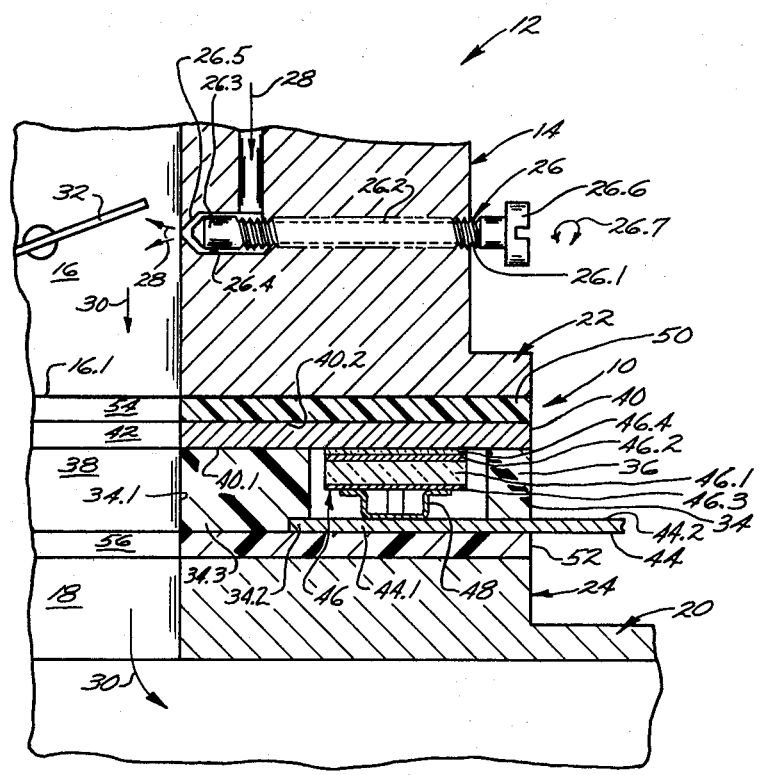
FIG. 2 is a partial section view to enlarged scale along line 2—2 of FIG. 1 further illustrating assembly of the gasket heater means in the novel and improved throttle body fuel supply system of this invention.

Referring to the drawings, 10 in FIG. 1 indicates the novel and improved gasket heater means of this invention which is shown in FIG. 2 to be incorporated in the novel and improved throttle body of the fuel system 12 of this invention. The system 12 includes a throttle body means 14 having passage means 16 open at one end 16.1 to communicate with a corresponding opening 18 at an intake manifold of an internal combustion engine diagrammatically indicated at 20 in FIG. 2. The throttle body means has flange means 22 arranged around the open passage end 16.1 for cooperating with corresponding or mating flange means 24 on the intake manifold and the gasket heater means 10 is arranged between the noted flange means for sealing communication between the passage means 16 and the intake manifold opening. Preferably screw means (Not shown) are extended through mounting holes 27 provided in the gasket means 10 and through corresponding mounting holes (not shown) in the throttle body flange means 22 and mating flange means 24 for mounting the throttle body on the engine in a conventional manner.

Nozzle means 26 of any conventional type are provided in the throttle body means to open into the passage means 16. In a usual application of the invention, the nozzle means 26 comprises idle speed fuel supply or inlet means in a carburetion system of conventional type for furnishing fuel into the passage as is diagrammatically indicated at 28 in FIG. 2, thereby to form an air-fuel mixture in the throttle body means and to furnish that mixture to the engine as is indicated in FIG. 2 by the arrows 30 for regulating idling operation of the engine in conventional manner. However, it will be understood that such nozzle means can comprise air inlet means or the like in a throttle body fuel injection or a direct port fuel injection system or the like within the scope of this invention. Throttle valve means 32 are movably mounted in the passage means for regulating the flow of the air-fuel mixture to the engine in conventional manner. Typically the idle speed fuel inlet nozzle means 26 comprises a needle or valve member 26.1 threadedly engaged in the throttle body means as diagrammatically indicated at 26.2 in FIG. 2 so that a valve end 26.3 of the member is movable in a fuel entry passage 26.4 toward and away from a valve seat 26.5 formed in the fuel entry passage when head means or other valve controlled means 26.6 or the like are rotated as is indicated by arrow 26.7. In that arrangement, movement of the valve member toward and away from the valve seat 26.5 regulates the entry of a stream of fuel 28 into the passage 16 so that the fuel rapidly evaporates in the passage to form the air-fuel mixture 30. As the nozzle means 26 is of any conventional type in accordance with this invention, it is not further described herein and it will be understood that the nozzle means comprises a fluid inlet into the passage means 16 of the type such that cooling which results from expansion of air or evaporation of fuel in the throttle body would tend to cause at least temporary or intermittent freeze-up of the nozzle means 26 resulting in occasional failure of engine firing or loss of engine driveability under at least some atmospheric conditions.

In accordance with this invention, the novel and improved gasket heater means 10 are arranged between the throttle body flange means 22 and the mating engine flange 24 so that electrical resistance heater means accommodated in the gasket means are located between portions of the throttle body flange means and the mating engine flange means at a selected location relative to the nozzle means 26 for transferring heat to the throttle body flange means for heating the throttle body and nozzle means to prevent such freeze-up of the nozzle means.

In a preferred embodiment of the invention, gasket means 10 comprises a first spacer layer member 34 formed of a relatively rigid, thermally and electrically insulating phenolic material or the like. The spacer member has a first opening which forms a chamber 36 in the spacer and has a second, typically larger opening 38 which is aligned with the passage means 16 and with the intake manifold opening 18 as shown in FIG. 2. The spacer member has a selected thickness providing the chamber 36 with a selected capacity as discussed below. A second, heat-transfer layer member 40, preferably formed of a metal material such as aluminum or the like of relatively high thermal and electrical conductivity has a corresponding opening 42 also aligned with the passage 16. The heat-transfer member has one side 40.1 which is secured in substantially coextensive, overlying relation to one side 34.1 of the spacer member. The heat-transfer member extends over the chamber 36 and is preferably sealed to the spacer 34 by an adhesive (not shown) or by fusing of the spacer material or the like for sealing one end of the chamber 36. An electrically conductive metal terminal means 44 is embedded in the heater means 10 to extend into the opposite end of the chamber 36. Preferably, for example, the terminal means comprises an element of aluminum or copper or the like which is embedded in a slot 34.2 in the spacer 34 so that one end 44.1 of the terminal extends into the chamber to cover said opposite end of the chamber, so that an opposite end 44.2 of the terminal extends out from a lateral edge of the spacer 34 for electrically connecting the terminal in an electrical circuit, and so that the terminal in the slot 34.2 is substantially flush with an outer surface 34.3 of the spacer, the slot preferably accommodating the terminal therein just slightly below the surface 34.3 for avoiding interference problems in subsequent assembly steps. Preferably the terminal is secured to the spacer by adhesive means or fusing of the spacer or the like so that the terminal 44 seals the opposite end of the chamber.

In accordance with this invention, a self-regulating electrical resistance heater means 46 is accommodated in the chamber 36 to be energized therein for transferring heat to the throttle body flange means 22 through the heat-transfer member 40. Preferably for example, the heater means comprises a heater unit having a body 46.1 of a ceramic material or the like such as lanthanum-doped barium titanate having a positive temperature coefficient of resistivity adapted to display a sharply anomalous increase in resistance at a selective, safe temperature level for stabilizing the heater at about that temperature. Ohmic contact layer 46.2, 46.3 of metal such as aluminum or the like are provided on opposite sides of the body 46.1 and one contact layer 46.2 at one side of the body is secured in electrically and thermally conducted relation to the heat-transfer member 40 so that the heater is accommodated in the chamber 36. Preferably for example, the heater body is secured to the member 40 by use of an electrically and thermally conductive, metal-filled epoxy adhesive 46.4 or the like as shown in FIG. 2. Electrically conductive spring means 48 such as a spider spring formed of berrylium copper or the like are also accommodated in the chamber 36 between the opposite side of the heater body and the terminal 44 for electrically connecting the terminal to the heater.

In accordance with this invention, third and fourth gasket layer members 50 and 52 each having an opening 54, 56 therein aligned with the passage 16 are disposed on opposite outer sides of the gasket means 10 to sealingly engage the throttle body flange means 22 and the intake manifold flange 24 respectively. The third and fourth layer members are preferably relatively thinner and of relatively more compressible electrically insulating material than the spacer 34 and are preferably secured by fusing or adhesive means or the like at opposite sides of the gasket means 10 so that one gasket layer member 50 is disposed in substantially coextensive, overlying relation to the heat-transfer member 40 and the other gasket member 52 overlies and is coextensive with the opposite side 34.3 of the spacer without interference with the terminal 44 accommodated in the slot 34.2. Typically for example, an asbestos-filled nitrile gasket material is used but other compressible materials with or without other fillers are also used within the scope of this invention. In a preferred embodiment of the invention, the gasket layer 50 has an additional terminal opening 50.1 therein (see FIG. 1) and additional resilient terminal spring means such as a plurality of leaves 58 are secured to the side 40.2 of the heat-transfer member 40 at one end 58.1 so that opposite ends 58.2 of the springs extend through the opening 50.1 to electrically engage the throttle body or intake manifold flanges 22 and 24 thereby to connect the side 46.2 of the heater body to the throttle body flange in the noted electrical circuit as will be understood.

In that arrangement, the end 44.2 of the terminal means embedded in the spacer is adapted to be electrically connected to an automotive power source such as the battery 58 through switch means or the like such as the ignition switch 60 diagrammatically illustrated in FIG. 1. The heater means 46 is thereby connected in an electrical circuit between the terminal 44 and the throttle body 14, as is diagrammatically indicated in FIG. 1. Accordingly the heater means is promptly energized when the switch 48 is closed for promptly generating heat and transferring that heat to the throttle body flange means 22 through the heat-transfer member 40 in an efficient manner. In that way, the throttle body means receives heat for preventing freeze-up of the nozzle means 26. The heater means is also self-regulating to stabilize at a safe temperature. The novel and improved gasket means 10 has a very low profile and is compactly accommodated between the flange means 22 and 24 and is readily connected in an electrical circuit. The heater means is safely and reliably accommodated within chamber 36 in the relatively rigid spacer 34 so it is protected during use when clamped between the flanges 22 and 24 and is preferably sealed therein for long service life. If desired, a thermostat means 62 as diagrammatically illustrated in FIG. 1 is also accommodated in a corresponding chamber in the rigid spacer 34 or the like, preferably adjacent to the nozzle means 26, to be responsive to throttle body temperature to open the noted circuit on warm days or the like for energizing the heater means 46 only when said temperature is below a selected ambient or other temperature level.

It should be understood that although particular embodiments of the gasket heater means and fuel supply system of this invention have been described by way of illustrating the invention, this invention includes all modifications and equivalents of the disclosed embodiments falling within the scope of the appended claims.

We claim:

1. A fuel supply system for an internal combustion engine comprising throttle body means having passage means open at one end for communicating with a corresponding opening in an intake manifold of the engine to furnish an air-fuel mixture to the engine, the throttle body means having flange means disposed around the open end of the passage means and having nozzle means at a selected location relative to the throttle body flange means for furnishing a fluid to said passage means for forming an air-fuel mixture, and gasket means arranged between the throttle body flange means and mating flange means disposed on the engine around the opening in the intake manifold for sealing communication between the passage means and the engine, characterized in that the gasket means provides selected spacing between said flanges and provides compressible sealing means at respective opposite sides of the gasket means sealingly engage the throttle body flange means and the mating engine flange means, a chamber is provided in the gasket means at a location between portions of the throttle flange means and said engine flange means in a limited part of the gasket means at a selected location adjacent to said nozzle means, and electrical resistance heater means are accommodated in the chamber between portions of the throttle body flange means and said engine flange means to be energized therein for transferring heat to the throttle body flange means for preventing freeze-up of said nozzle means during furnishing of said fluid for forming said air-fuel mixture.

2. A fuel supply system as set forth in claim 1 further characterized in that said nozzle means comprises idle speed fuel inlet means for the engine and said electrical resistance heater means embodies a self-regulating heater unit of a material of positive temperature coeffecient of resistivity arranged immediately adjacent said nozzle means for heating said nozzle means for avoiding freeze-up of the nozzle means during expansion and evaporation of air or fuel in the throttle body means.

* * * * *